(12) United States Patent
Vignolo et al.

(10) Patent No.: US 10,697,833 B2
(45) Date of Patent: Jun. 30, 2020

(54) INDEX FOR DETERMINING A QUALITY OF A COLOR

(71) Applicant: BASF Coatings GmbH, Münster (DE)

(72) Inventors: Carlos Vignolo, Wuerzburg (DE); Heinrich Cloppenburg, Muenster (DE)

(73) Assignee: BASF Coatings GmbH, Münster (DE)

( * ) Notice: Subject to any disclaimer, the term of this patent is extended or adjusted under 35 U.S.C. 154(b) by 11 days.

(21) Appl. No.: 15/526,462

(22) PCT Filed: Nov. 13, 2015

(86) PCT No.: PCT/EP2015/025084
§ 371 (c)(1),
(2) Date: May 12, 2017

(87) PCT Pub. No.: WO2016/074801
PCT Pub. Date: May 19, 2016

(65) Prior Publication Data
US 2017/0328774 A1 Nov. 16, 2017

(30) Foreign Application Priority Data
Nov. 13, 2014 (EP) ..................................... 14003821

(51) Int. Cl.
*G01J 3/46* (2006.01)
*G01J 3/50* (2006.01)
(Continued)

(52) U.S. Cl.
CPC ................ *G01J 3/463* (2013.01); *G01J 3/10* (2013.01); *G01J 3/50* (2013.01); *G01J 3/504* (2013.01);
(Continued)

(58) Field of Classification Search
CPC .... G01J 3/463; G01J 3/10; G01J 3/504; G01J 3/50; G01N 21/293; G01N 21/251; G01N 21/276; G01N 21/278
See application file for complete search history.

(56) References Cited

U.S. PATENT DOCUMENTS 4,917,495 A * 4/1990 Steenhoek ............ G01J 3/0251
356/328
5,740,078 A   4/1998 Cheetam et al.
(Continued)

FOREIGN PATENT DOCUMENTS

| CN | 103344338 A | 10/2013 |
| DE | 10208696 A1 | 9/2002 |

(Continued)

OTHER PUBLICATIONS

Beuth, "Tolerances for automotive paints—Part 1: Uni paints", DIN 6175-1, Jul. 2009.

(Continued)

*Primary Examiner* — Violeta A Prieto
(74) *Attorney, Agent, or Firm* — Armstrong Teasdale LLP

(57) ABSTRACT

The present invention relates to a method for determining a characteristic number for characterizing the quality of a shade setting of a paint in relation to a color reference, characterized in that colorimetric coordinates of the paint and of the color reference are determined with a spectrophotometer for a number of measurement geometries and wherein respective color differences are calculated and standardized from the colorimetric coordinates of the paint and of the color reference for each measurement geometry of the number of measurement geometries, and where a group of characteristic values calculated from the respective standardized color differences is assigned a scale value for (Continued)

| Q | | | | |
|---|---|---|---|---|
| 1 | <dE>sum(25-75) > = 12 | <dE>25, 45, 75 > = 6 | | max<dE>(CIE94, 45) > = 6 |
| 2 | <dE>sum(25-75) < 12 | <dE>25, 45, 75 < 6 | | max<dE>(CIE94, 45) < 6 |
| 3 | <dE>sum(25-75) < 10 | <dE>25, 45, 75 < 4.5 | | max<dE>(CIE94, 45) < 4.5 |
| 4 | <dE>sum(25-75) < 6 | <dE>25, 45, 75 < 3 | | max<dE>(CIE94, 45) < 3 |
| 5 | <dE>sum(25-75) < 3.9 | <dE>25, 45, 75 < 2 | | max<dE>(CIE94, 45) < 2 |
| 6 | <dE>sum(15-110) < 6.5 | <dE>15, 25, 45, 75, 110 < 2 | | max<dE>(CIE94, 45) < 1.7 |
| 7 | | <dE>15, 25, 45, 75, 110 < 1.73 | <dS>15, 45, 75 < 1.73   <dG> < 1.73 | max<dE>(CIE94, 45) < 1.4 |
| 8 | | <dE>-15, 15, 25, 45, 75, 110 < 1.41 | <dS>15, 45, 75 < 1.41   <dG> < 1.41 | max<dE>(CIE94, 45) < 1.0 | determining the characteristic number by means of an assignment rule to be provided in advance.

8 Claims, 5 Drawing Sheets

(51) Int. Cl.
*G01N 21/27* (2006.01)
*G01J 3/10* (2006.01)
*G01N 21/29* (2006.01)
*G01N 21/25* (2006.01)

(52) U.S. Cl.
CPC ......... *G01N 21/251* (2013.01); *G01N 21/276* (2013.01); *G01N 21/278* (2013.01); *G01N 21/293* (2013.01)

(56) References Cited

U.S. PATENT DOCUMENTS

| | | | | |
|---|---|---|---|---|
| 6,459,425 B1* | 10/2002 | Holub | ...................... | G01J 3/02 345/207 |
| 6,494,608 B1* | 12/2002 | Retamal | ................. | B01F 3/088 366/132 |
| 2006/0280360 A1* | 12/2006 | Holub | ...................... | G01J 3/02 382/162 |
| 2011/0013176 A1 | 1/2011 | Schwarz et al. | | |
| 2011/0160892 A1* | 6/2011 | Kettler | ...................... | G01J 3/46 700/105 |
| 2014/0242271 A1* | 8/2014 | Prakash | ................... | B60S 5/00 427/140 |
| 2016/0005187 A1* | 1/2016 | Prakash | .................. | G01J 3/504 356/402 |

FOREIGN PATENT DOCUMENTS

| | | | | |
|---|---|---|---|---|
| DE | 102014010239 A1 | 1/2016 | | |
| WO | 03029811 A1 | 4/2003 | | |
| WO | 2013049796 A1 | 4/2013 | | |
| WO | WO 2014134099 A1 * | 9/2014 | ............. | G01J 3/504 |

OTHER PUBLICATIONS

Extended European Search Report for EP Application No. 14003821.7, dated Sep. 17, 2015, 13 pages.
International Preliminary Report on Patentability for PCT Application No. PCT/EP2015/025084, dated May 26, 2017, 12 pages of English Translation and 14 pages of IPRP.
International Search Report and Written Opinion for PCT Application No. PCT/EP2015/025084, dated Sep. 23, 2016, 21 pages.

\* cited by examiner

| Q | | |
|---|---|---|
| 1 | <dE>sum(25-75) >= 12 | <dE>25, 45, 75 > = 6 | max<dE>(CIE94, 45) > = 6 |
| 2 | <dE>sum(25-75) < 12 | <dE>25, 45, 75 < 6 | max<dE>(CIE94, 45) < 6 |
| 3 | <dE>sum(25-75) < 10 | <dE>25, 45, 75 < 4.5 | max<dE>(CIE94, 45) < 4.5 |
| 4 | <dE>sum(25-75) < 6 | <dE>25, 45, 75 < 3 | max<dE>(CIE94, 45) < 3 |
| 5 | <dE>sum(25-75) < 3.9 | <dE>25, 45, 75 < 2 | max<dE>(CIE94, 45) < 2 |
| 6 | <dE>sum(15-110) <6.5 | <dE>15, 25, 45, 75, 110 < 2 | |
| 7 | | <dE>15, 25, 45, 75, 110 < 1.73 | <dS>15, 45, 75 < 1.73 | <dG> < 1.73 | max<dE>(CIE94, 45) < 1.7 |
| 8 | | <dE>15, 25, 45, 75, 110 < 1.41 | <dS>15, 45, 75 < 1.41 | <dG> < 1.41 | max<dE>(CIE94, 45) < 1.4 |

Fig. 1

| 21 | | <MDE> 23 | Q 25 |
|---|---|---|---|
| 01_DE02-2014-00730_PLATINUM GRAY SOLUTION | ... | 3.70 | 3 |
| 02_DE02-2014-00730_PLATINUM GRAY SOLUTION | ... | 1.66 | 4 |
| 03_DE02-2014-00730_PLATINUM GRAY SOLUTION | ... | 1.81 | 4 |
| 04_DE02-2014-00730_PLATINUM GRAY SOLUTION | ... | 1.51 | 5 |
| 05_DE02-2014-00730_PLATINUM GRAY SOLUTION | ... | 0.95 | 6 |

Fig. 2

| | Q | 1 | 3 | 4 | 7 | 8 |
|---|---|---|---|---|---|---|
| 01_DE02-2014-00933_FIR GREEN SOLUTION | | ... | ... | ... | ... | ... |
| 02_DE02-2014-00933_FIR GREEN SOLUTION | | ... | ... | ... | ... | ... |
| 03_DE02-2014-00933_FIR GREEN SOLUTION | | ... | ... | ... | ... | ... |
| 04_DE02-2014-00933_FIR GREEN SOLUTION | | | | | | |
| 05_DE02-2014-00933_FIR GREEN SOLUTION | | | | | | |

Fig. 4

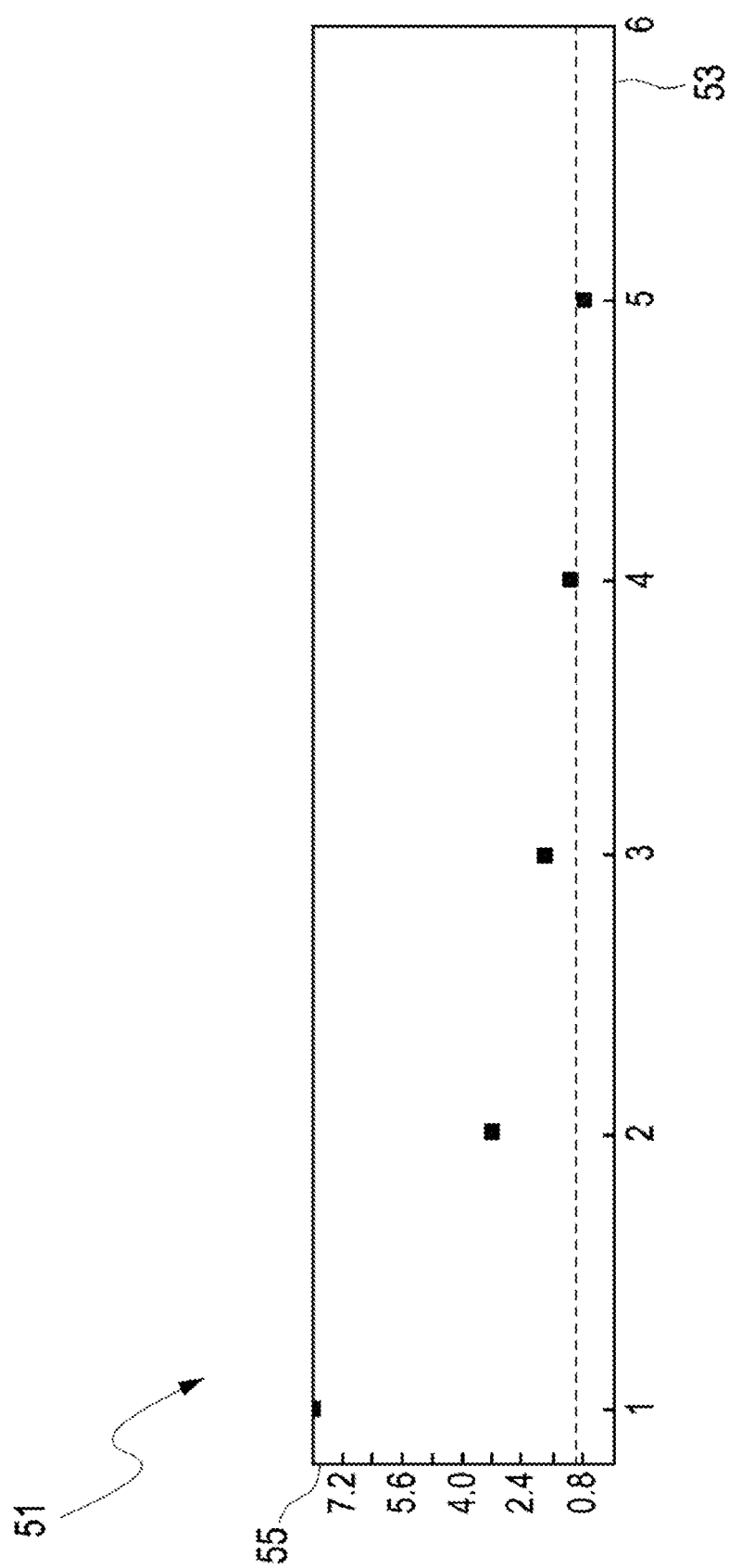

INDEX FOR DETERMINING A QUALITY OF A COLOR

CROSS-REFERENCE TO RELATED APPLICATIONS

This application is a U.S. National Phase Application of PCT/EP2015/025084, filed Nov. 13, 2015, which claims the benefit of priority to European Patent Application No. 14003821.7, filed Nov. 13, 2014, the entire contents of which are hereby incorporated by reference herein.

BACKGROUND

The present invention relates to a method for determining a characteristic number for characterizing a quality of a shade setting of a paint. The present invention further relates to a computer program for implementing the method of the invention.

In the mixing of a paint, i.e., in the case of a shade setting, different shades are mixed and then compared with a color reference or a shade original. For this purpose, traditionally, the mixed paint is measured spectrophotometrically and resultant measurement values, i.e., for example, colorimetric coordinates, are compared with corresponding measurement values for the color reference. Particularly in the case of effect paints comprising a number of effect pigments, a meaningful comparison between a particular effect paint and a particular color reference is possible only using measurement values determined under different measurement geometries. This means that in order to compare a paint with a color reference, it is necessary to determine a multiplicity of measurement values for a multiplicity of measurement geometries.

There are methods known in the prior art which provide for limited comparison of a particular paint with a particular shade original, i.e., color reference, without taking account of any effect pigments present, for only three measurement geometries.

Publication WO 2013/049796 A1 relates to a method for comparing a paint with a reference, the reference used being color characteristics of a color formula.

Publication DE 102 08 696 A1 discloses a method wherein colors approximated to a metallic color are calculated by means of color classification codes.

The US-American publication US 2011/013176 A1 discloses a method for determining properties of a surface.

It is against this background that a method is presented for determining a characteristic number for characterizing a quality of a shade setting of a paint in relation to a color reference, wherein colorimetric coordinates of the paint and of the color reference are determined with a spectrophotometer for a number of measurement geometries and wherein respective color differences are calculated and standardized from the colorimetric coordinates of the paint and of the color reference for each measurement geometry of the number of measurement geometries, and where a group of characteristic values calculated from the respective standardized color differences is assigned a scale value for determining the characteristic number by means of an assignment rule to be provided in advance.

BRIEF DESCRIPTION

A number of measurement geometries comprises at least one measurement geometry.

A color difference in the context of the present invention is a difference between two colors in a color space, more particularly in an L*a*b* color space or an L*C*h° color space.

A measurement geometry in the context of the method presented is a measurement setup with a measuring instrument, such as, for example, a spectrophotometer, which is arranged at a defined angle with respect to a surface treated with a particular paint.

Colorimetric coordinates in the context of the present invention are coordinates in a color space for describing a color or gray level, more particularly in an L*a*b* color space or an L*C*h° color space.

A group of characteristic values means a number of characteristic values which are calculated from color differences between color coordinates of a particular paint and of a particular color reference, and which are used for assigning a corresponding characteristic number Q to a particular comparison of paint and reference color or color reference. Of course, the characteristic number is suitable for comparison of paint and reference color not only for solid-color paints but also for effect paints. This means that with the characteristic number provided in accordance with the invention, comparisons of effect paints to respective color references and/or comparisons of solid-color paints to respective color references can be assessed. The group of characteristic values here may also consist of just one characteristic value, as envisaged in general when employing the method of the invention for solid-color paints.

The L*C*h° color space corresponds to the L*a*b color space with the exception that rather than Cartesian coordinates a* and b*, cylindrical coordinates C* for chroma and h° for hue angle are used. Lightness (L*) remains unchanged.

In order to compare a particular paint with a color reference, such as another paint, for example, provision is made for the determination or calculation of a characteristic number Q, which allows or indicates a comparison or a quality value of a match of the respective paint, i.e., for example, of an effect paint or of a solid-color paint with the respective color reference in a scale, such as a school grade scale from 1 to 8, for example.

For the determination of the characteristic number Q, provision is made for respective colorimetric coordinates or color coordinates to be determined, these coordinates being indicated, for example, in a so-called L*a*b* color space, for both the respective paint and the respective color reference under different measurement geometries, and/or using different illuminants, using a spectrophotometer, for example. On the basis of the color coordinates determined for the respective paint and the respective color reference, it is possible to calculate a corresponding color difference between the respective paint and the respective color reference for each measurement geometry, i.e., for each measurement angle and/or for each illuminant, using formula (1) for achromatic colors and using formula (2) for chromatic colors.

$$<dE_{Lab}> = \sqrt{<dL^*>^2 + <da^*>^2 + <db^*>^2} \quad (1)$$

$$<dE_{Lch}> = \sqrt{<dL^*>^2 + <dC^*>^2 + <dh^{*\circ}>^2} \quad (2)$$

A distinction between chromatic and achromatic colors may be ascertained in accordance, for example, with DIN 6175-2. Moreover, provision is made for the respective measured color coordinates in the formulae (1) and (2) to be standardized. In order to standardize the respective measured color coordinates, it is possible to make use, for example, of formula (3).

$$<dX^*> = \frac{dX^*}{S_x} \quad (3)$$

In formula (3), a standardized value $<dX^*>$ is calculated by dividing a respective value $dX^*$, i.e., a value of a respective variable, of a color difference by a respective angle-specific tolerance $S_x$, the angle-specific tolerance or acceptance limit $S_x$ being calculated according to equation (4).

In this case a standardization may take place, in accordance for example with equation system (4), $$S_L = S_a = S_b = \frac{1}{3}$$

$$S_C = (1 + 0.048 \cdot C_R^*)/3$$

$$S_h = (1 + 0.014 \cdot C_R^*)/3 \quad (4)$$

where $C^*_R$ is the colorfulness, i.e., chroma or saturation, of a color reference R in the L*a*b* color space and is calculated using the equation $C_R^* = \sqrt{(a_R^*)^2 + (b_R^*)^2}$, the index "R" indicating the color reference R.

The color differences determined and/or the standardized color differences determined between the respective paint and the respective color reference for the different measurement geometries and/or the different illuminants together form, for example, a group of characteristic values. Additionally, a sum of the color differences or of a selection of the color differences may also represent a characteristic value belonging to the group of characteristic values, for the different measurement geometries and/or the different illuminants. Furthermore, as a characteristic value, it is also possible, for example, to provide a maximum value among the standardized color differences determined between a respective paint and a respective color reference for—for example—one measurement geometry and two different illuminants.

In order to take account of respective effect properties of an effect paint in the context of the method of the invention, provision is made for sparkle differences and graininess differences, measured with a goniospectrophotometer, to be taken into account. For this purpose, respective values, measured using the goniospectrophotometer, for the sparkle differences and the graininess differences, respectively, are standardized using formula (3), for example, and are taken into account in assignment of respective calculated color differences to a scale value of the characteristic number Q, i.e., in a respective assignment rule, which is to be provided in advance.

For the assignment of respective color differences and/or sparkle differences and/or graininess differences, measured under different measurement geometries, to a respective scale value of the characteristic number Q, provision is made for color differences calculated and standardized for an effect paint for respective color geometries to be combined with one another, by summing, for example, and for the result of such a combination to be assigned to a discrete scale value of the characteristic number Q, optionally using further conditions on the basis of an assignment rule which regulates, for example, intervals between respective scale values.

In the case of a respective assignment rule, as well as respective color differences of respective measurement geometries that have been combined with one another, in an assessment of effect paints, it is possible to use further conditions, such as, for example, a minimum or maximum difference between color differences, sparkle differences and/or graininess differences of specific measurement geometries.

Provision is further made—for the case where a so-called solid-color paint is to be compared with a corresponding color reference—for color differences of only one measurement geometry, determined under at least two different illuminants, to be offset against one another by, for example, the formation of an average of the color differences determined, or determination of the maximum value among the color differences determined. A distinction between solid-color and effect paints may be determined, for example, according to DIN 6175-1. On the basis of the combined color differences, a respective solid-color paint can be assigned to a respective scale value of the characteristic number Q in accordance with a corresponding assignment rule, to give the characteristic number Q according to the invention.

The present invention further relates to a computer program with program code means to implement all steps of the method according to the invention when the computer program is executed on a computer or corresponding computing unit.

The computer program according to the invention serves in particular for executing the method of the invention on a computer or computing unit.

One possible form of the computer program according to the invention might include, for example, the following steps:

1. Determination of all color coordinates for all available measurement geometries of a paint and of a color reference in a color space.

2. Calculation of respective color differences between the paint and the color reference for all measurement geometries.

3. If the paint to be compared is an effect paint, calculation of respective sparkle differences and/or graininess differences for each measurement geometry.

4. If the paint to be compared is a solid-color paint, calculation of respective color differences for at least two illuminants.

5. Standardization of the color differences calculated in step 2 and/or 4 and also of the sparkle differences and/or graininess differences calculated optionally in step 3.

6. In the case of an effect paint, summation of the respective standardized color differences.

7. In the case of a solid-color paint, determination of the maximum value among the determined color differences from step 4.

8. Depending on the type of paint, effect paint or solid-color paint, allocation of the characteristic values determined in steps 2 and 6 or of the characteristic value determined in step 7 to a respective scale value of the characteristic number Q according to an assignment rule.

In accordance with the invention, therefore a specific characteristic number Q is provided for determining the color quality of a paint by means of precisely defined rules. The quality stages are defined, as set out below in connection with the figures, by means of unambiguous equations. This automatically produces the assignment rule with specified weighting factors according to type of shade (solid-color or effect paint). Only if all the criteria are met, i.e. all the equations of a quality stage, corresponding in each case to a specific characteristic number Q, is the respective paint assigned this specific scale value for the characteristic number Q. If not all of the criteria of a quality stage are met, assignment takes place to the next-lower quality stage. If not all of the quality criteria are met there either, assignment takes place to the next-lower quality stage in turn, and so on. If not all of the quality criteria are met in the second-lowest quality stage, assignment takes place to the lowest quality stage. Assignment to the lowest quality stage is always made when the respective quality criteria are not met for any higher quality stage.

Further advantages and embodiments of the invention are evident from the description and the appended drawings.

It is understood that the features stated above and those still to be elucidated below can be used not only in the particular combination specified but also in other combinations, or on their own, without departing from the scope of the present invention.

The invention is represented schematically in the drawing, with reference to a working example, and is described comprehensively below with reference to the drawing.

BRIEF DESCRIPTION OF THE DRAWINGS

FIG. 1 shows an assignment table with assignment rules for assignment of respective color differences to a respective scale value of the characteristic number Q in accordance with one possible embodiment of the method presented.

FIG. 2 shows embodiments of the inventively envisaged characteristic number Q in relation to an average of respective color differences between five different paints and one color reference.

FIG. 4 shows embodiments of the inventively envisaged characteristic number Q for different solid-color paints.

FIG. 5 shows a graphical representation of color differences of the different solid-color paints from FIG. 4.

FIG. 1 shows a Table 10 with three columns 13, 15, and 17. The first column, 13, indicates scale values of a characteristic number Q, which span a rating scale from 1 to 8, with 1 indicating the poorest quality, i.e., the worst possible match of a respective paint with a corresponding color reference, and 8 the best quality, i.e., the best possible match of a respective paint with a corresponding color reference.

Figure 3:
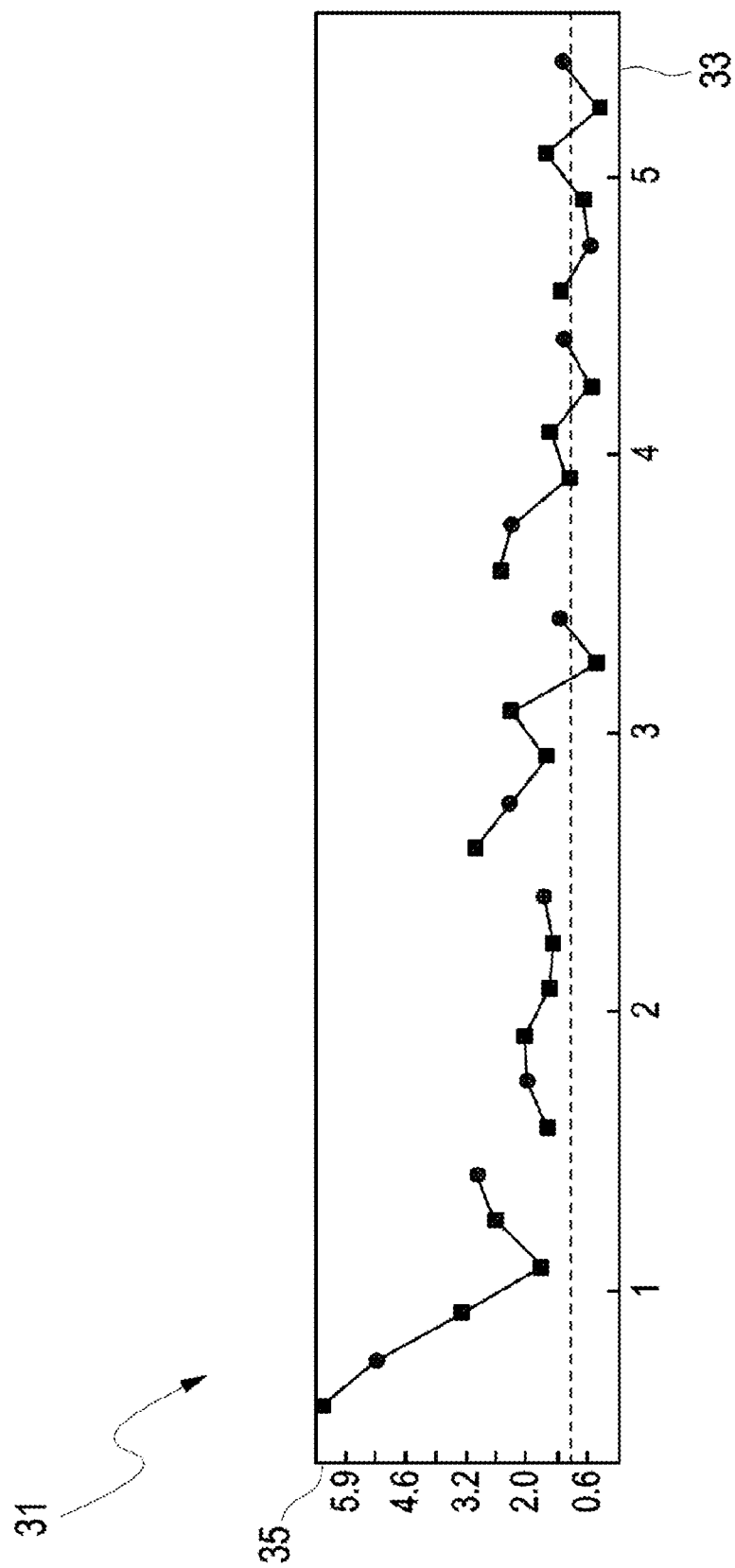
FIG. 3 shows a graphical representation of the color differences from FIG. 2.

Column 15 indicates assignment rules for calculated color differences from spectral measurements of an effect paint and of a corresponding color reference to a respective scale value of the characteristic number Q in the form of clear concrete equations. In order to assign a quality of a correspondence of an effect paint to a respective color reference of a characteristic number Q, there are at least four and at most ten conditions each defined by a specific equation, that must be met. The term "equation" here is to be interpreted broadly, namely both as "equation" in the narrower sense, as a statement concerning the identity of two terms, and also as "inequation" in the narrower sense, as a comparison of magnitude between two terms.

DETAILED DESCRIPTION

It is specified in line 1 of column 15, for example, that when a sum of all the calculated color differences for measurement geometries between 25° and 75°, i.e., $$\sum_{25}^{75} <dE>,$$

is greater than or equal to a value of 12, and each of the measurement geometries 25°, 45°, and 75° when considered alone is greater than or equal to a value of 6, the respective paint is assigned to the characteristic number Q with the scale value 1. Since the characteristic number Q with the scale value 1 represents the lowest quality stage here, assignment to the characteristic number Q=1 is also made if, for example, the sum of all the measured color differences for measurement geometries between 25° and 75°, i.e., $$\sum_{25}^{75} <dE>,$$

is greater than or equal to 12 but, for example, the color difference for one measurement geometry of the measurement geometries 25°, 45°, and 75° when considered alone is less than 6.

The sum $$\sum_{25}^{75} <dE>$$

corresponds in general to a summation of the color differences for the individual measurement geometries 25°, 45°, and 75°. Correspondingly, $$\sum_{15}^{110} <dE>$$

corresponds to a summation of the color differences for the individual measurement geometries 15°, 25°, 45°, 75°, and 110°.

At all higher quality stages, i.e. Q=2, 3, 4, 5, 6, 7, and 8, all quality criteria and all equations assigned to the respective quality stages must be met in each case by the color differences determined, for a corresponding paint to be assigned to the respective quality stage or to the corresponding characteristic number Q=2, 3, 4, 5, 6, 7 or 8.

Since in the case of effect paints there are also sparkle differences and graininess differences to be taken into account, provision is made, especially in the case of high characteristic numbers, corresponding to a high quality of a match between a respective effect paint and a corresponding color reference, for intensified conditions, i.e., additional conditions, to apply. This means that in order, for example, to satisfy respective criteria for an assignment to the characteristic number Q with a value of 7, for a respective effect paint, no color difference dE calculated in each case on the basis of measurement geometries between 15° and 110° relative to a corresponding color reference may have a value greater than or equal to 1.73. Correspondingly, each color difference dE calculated for the measurement geometries 15°, 25°, 45°, 75°, and 110° must be smaller than 1.73. In addition, a sparkle difference dS between the respective effect paint and the corresponding color reference may not be greater than or equal to a value of 1.73 for any of the measurement geometries 15°, 45°, and 75°. Moreover, a graininess difference dG between the respective effect paint and the corresponding color reference may not be greater than or equal to a value of 1.73.

Since solid-color paints frequently exhibit a metamerism effect, i.e., a different color or gray level on illumination with different illuminants, independent assignment rules are envisaged for solid-color paints, as shown in column 17.

For the assignment of a respective solid-color paint to a respective scale value with the characteristic number Q, a maximum value of a color difference or of a gray level difference is calculated between a respective solid-color paint and a corresponding color reference, each measured under different illuminants, as for example under illuminant D64 and illuminant TL84, for a measurement geometry of, for example, 45° in each case, on the basis of a color difference formula CIE94 based on an L*C*h° color space. This means that the solid-color paint is assigned, for example, to a characteristic number Q with a scale value of 1, when the respective solid-color paint has a maximum value among the determined color differences between the respective solid-color paint and the corresponding color reference, based on spectral measurements under illuminants D64 and TL84, of greater than or equal to a value of 6.

For assignment to other values of the characteristic number Q, corresponding criteria are defined in columns 15 (for effect paints) and 17 (for solid-color paints) of Table 10.

FIG. 2 shows a Table 20 which in a first column 21 indicates different effect paints and in column 23 indicates an average color difference calculated for a color reference over different measurement geometries of 15°, 25°, 45°, 75°, and 110°, and also indicates, in column 25, a corresponding scale value of the characteristic number Q. The characteristic number Q is, in particular, ordinally scaled, and so respective scale values of the characteristic number Q are always integral.

All of the paints listed in column 21 were compared with an individual color reference, in order to identify the paint having the best match to the single color reference.

Whereas for checking in accordance with the prior art it is possible only to compare the color differences determined at different measurement geometries, possibly individually for different illuminants, a qualitative match of a respective paint from column 21 to the color reference can be assessed on the basis of the characteristic number Q, as shown in column 25, while simultaneously considering a plurality of quality criteria, such as, for example, a plurality of color differences determined under different illuminants and/or different measurement geometries.

Since paint "05", i.e., the paint from the fifth line of Table 20, shows the highest scale value for Q, namely 6, the paint 5, out of all the paints shown in Table 20, is the best match with the color reference.

Column 23 shows average color differences calculated via an arithmetic mean. It should be emphasized in this context that none of the average color differences specified in column 23 allows a conclusive assessment to be made about the quality of a match between a respective paint and the color reference. Whereas traditional measured values, such as an average color difference, for example, allow only a comparison on the basis of one condition, i.e., one position in the color space, it is possible via the characteristic number Q to jointly assess and quantify a plurality of criteria, such as, for example, color difference in the color space, sparkle difference, and behavior under different illuminants.

An increase in respective scale values of the characteristic number Q, as are shown in column 25, such increase having been determined on the basis of measurement values under different illuminants, may be accompanied by a reduction in corresponding average color differences MDE, as shown in column 23. Correspondingly, the values in columns 23 and 25 are generally inversely proportional to one another.

FIG. 3 shows an experimental profile for discovering a paint with optimal correspondence to the color reference, from FIG. 2, on the basis of a comparison of color differences.

A diagram 31, comprising an abscissa 33, which indicates a respective paint 1 to 5, and an ordinate 35, which indicates color differences dE calculated for respective measurement geometries of 15°, 25°, 45°, 75°, and 110° between the respective paint and the color difference, is a graphical representation of the paints described in FIG. 2 and of their respective color differences with respect to a corresponding color reference.

In order to compare the five different paints in FIG. 2 with one another and to identify the paint which matches best with the color reference, it is necessary, traditionally, to compare the color differences of the respective paints 1 to 5, plotted in the diagram 31, for each of the measurement geometries of 15°, 25°, 45°, 75°, and 110°, manually by a skilled person. In this context it is difficult to differentiate in particular between paints 2 and 5, since both paints show comparable color differences and match both better and worse with the color reference, relative to the other respective paint, for different measurement geometries. It is therefore almost impossible to find an objective basis for a selection between paint 2 or paint 5, whereas the characteristic number Q, as shown in FIG. 2, identifies paint 5 without doubt as the paint best matching with the color reference, and evaluates paint 2 as even poorer than paint 4.

By means of the inventive characteristic number Q, accordingly, a respective paint best matching with a color reference can be identified quickly and without expert knowledge by a comparison of merely one respective characteristic number Q per paint.

FIG. 4 shows a Table 40 which, in analogy to FIG. 2, describes five different paints in column 41 and shows corresponding characteristic numbers Q in column 43. Since the paints described in Table 40 are solid-color paints, measured only at a measurement geometry of 45°, no averaged color difference has been calculated. This means that there is only one color difference for each paint per illuminant, in this case illuminant D65, available for assessment.

FIG. 5 shows a diagram 51 which corresponds to Table 40 in FIG. 4 and which comprises an abscissa 53, which indicates a respective paint 1 to 5, and an ordinate 55, which indicates color differences dE calculated between respective paint and a color reference. In order to compare the different solid-color paints in respect of any metamerism effect as well, different measurements under different illuminants are necessary, which must be assessed in each case via an independent diagram and/or via different color differences, in order to identify a paint best matching the respective color reference.

Since the inventive characteristic number Q unites different measurement values, determined under illuminants which are different, for example, it is possible to compare a solid-color paint, even with respect to a metamerism effect, with a respective color reference, quickly and easily, on the basis of just a single characteristic number Q per paint.

What is claimed is:

1. A method for determining a characteristic number for characterizing the quality of a shade setting of a solid-color paint in relation to a color reference, the method consisting of:
   a) determining colorimetric coordinates of the paint and of the color reference with a spectrophotometer for a number of measurement geometries and using at least one illuminant;
   b) calculating color differences from the colorimetric coordinates of the paint and of the color reference for each measurement geometry of the number of measurement geometries;
   c) calculating color differences from the colorimetric coordinates of the paint and of the color reference for each of the at least one illuminant used;
   d) standardizing the color differences calculated in (b) or (c);
   e) determining a maximum value among the calculated color differences from (c); and
   f) assigning a scale value for determining the characteristic number to a characteristic value from (e) using an assignment rule provided in advance.

2. The method as claimed in claim 1, wherein the assignment rule for solid-color paints comprises rules which specify that a characteristic value from (e) is assigned to a scale value 1 on a basis of a color difference formula based on an $L^*C^*h°$ color space, when the characteristic value is greater than or equal to 6, and that the characteristic value is assigned to a scale value 2 when the characteristic value is less than 6, and that the characteristic value is assigned to a scale value 3 when the characteristic value is less than 4.5, and that the characteristic value is assigned to a scale value 4 when the characteristic value is less than 3, and that the characteristic value is assigned to a scale value 5 when the characteristic value is less than 2, and that the characteristic value is assigned to a scale value 6 when the characteristic value is less than 1.7, and that the characteristic value is assigned to a scale value 7 when the characteristic value is less than 1.4, and that the characteristic value is assigned to a scale value 8 when the characteristic value is less than 1.0.

3. A computer program with program code means to implement all steps of a method as claimed in claim 1, wherein the computer program is executed on at least one of a computer and a corresponding computing unit.

4. The computer program as claimed in claim 3, stored on a computer-readable data medium.

5. A method for determining a characteristic number for characterizing the quality of a shade setting of an effect paint in relation to a color reference, the method consisting of:
   a) determining colorimetric coordinates of the paint and of the color reference with a spectrophotometer for a number of measurement geometries and using at least one illuminant;
   b) calculating color differences from the colorimetric coordinates of the paint and of the color reference for each measurement geometry of the number of measurement geometries;
   c) calculating at least one of respective sparkle differences and graininess differences between the paint and the color reference, measured with a goniospectrophotometer;
   d) standardizing the color differences calculated in (b) and the sparkle differences or graininess differences calculated in (c);
   e) summing all the standardized color differences from (d); and
   f) assigning a scale value for determining the characteristic number to a characteristic value from (b) or (e) using an assignment rule provided in advance.

6. The method as claimed in claim 5, wherein the assignment rule for effect paints comprises rules which specify that assignment to a scale value 1 is made when a first effect characteristic value from (e), formed on a basis of a sum of all the color differences between an effect paint and an effect paint reference for a number of measurement geometries between 25° and 75°, is greater than or equal to 12 and respective effect color differences between the effect paint and the effect paint reference, determined for the measurement geometries of 25°, 45°, and 75°, are greater than or equal to 6 when considered each on their own, and that assignment to a scale value 2 is made when the first effect characteristic value is less than 12 and each of the effect color differences determined for the measurement geometries of 25°, 45°, and 75° is less than 6, and that assignment to a scale value 3 is made when the first effect characteristic value is less than 10 and each of the effect color differences determined for the measurement geometries of 25°, 45°, and 75° is less than 4.5, and that assignment to a scale value 4 is made when the first effect characteristic value is less than 6 and each of the effect color differences determined for the measurement geometries of 25°, 45°, 75° is less than 3, and that assignment to a scale value 5 is made when the first effect characteristic value is less than 3.9 and each of the effect color differences determined for the measurement geometries of 25°, 45°, 75° is less than 2, and that assignment to a scale value 6 is made when a second effect characteristic value from (e), formed for a number of measurement geometries between 15° and 110°, is less than 6.5 and each of the effect color differences determined for the measurement geometries of 15°, 25°, 45°, 75°, and 110° is less than 2, and assignment to a scale value 7 is made when the second effect characteristic value is less than 6.5, each of the effect color differences determined for the measurement geometries of 15°, 25°, 45°, 75°, and 110° is less than 1.73, and each of a sparkle difference from (c) between the effect paint and the effect paint reference, determined for the measurement geometries of 15°, 45°, 75°, is less than 1.73 and a graininess difference from (c) between the effect paint and the effect paint reference is less than 1.73, and that assignment to a scale value 8 takes place when the second effect characteristic value is less than 6.5 and each of the effect color differences formed for the measurement geometries of −15°, 15°, 25°, 45°, 75°, and 110° is less than 1.41, and each sparkle difference from (c) between the effect paint and the effect paint reference, determined for the measurement geometries of 15°, 45° and 75°, is less than 1.41, and the graininess difference from (c) between the effect paint and the effect paint reference is less than 1.41.

7. A computer program with program code means to implement all steps of a method as claimed in claim 5, wherein the computer program is executed on at least one of a computer and a corresponding computing unit.

8. The computer program as claimed in claim 7, stored on a computer-readable data medium.

* * * * *